United States Patent
Short et al.

(10) Patent No.: US 10,409,143 B2
(45) Date of Patent: Sep. 10, 2019

(54) TRACKING A HANDHELD DEVICE ON SURFACES WITH OPTICAL PATTERNS

(71) Applicant: Hewlett-Packard Development Company, L.P., Houston, TX (US)

(72) Inventors: David Bradley Short, San Diego, CA (US); Roya Susan Akhavain, San Diego, CA (US); Jeff Borra, Poway, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 30 days.

(21) Appl. No.: 15/521,999

(22) PCT Filed: Jan. 23, 2015

(86) PCT No.: PCT/US2015/012773
§ 371 (c)(1),
(2) Date: Apr. 26, 2017

(87) PCT Pub. No.: WO2016/118173
PCT Pub. Date: Jul. 28, 2016

(65) Prior Publication Data
US 2017/0329207 A1    Nov. 16, 2017

(51) Int. Cl.
*G03B 21/00* (2006.01)
*G06F 3/042* (2006.01)
(Continued)

(52) U.S. Cl.
CPC ........... *G03B 21/005* (2013.01); *G03B 17/54* (2013.01); *G06F 3/03545* (2013.01); *G06F 3/03547* (2013.01); *G06F 3/044* (2013.01); *G06F 3/0425* (2013.01); *G06F 3/0426* (2013.01); *G06F 3/04886* (2013.01); *G06K 9/46* (2013.01)

(58) Field of Classification Search
CPC ...................................................... G03B 21/005
See application file for complete search history.

(56) References Cited

U.S. PATENT DOCUMENTS

2008/0252064 A1\* 10/2008 Sekine .................. B42D 15/00
283/91
2009/0128499 A1    5/2009 Izadi et al.
(Continued)

FOREIGN PATENT DOCUMENTS

CN         102165399 A    8/2011
WO    WO-2012-121517 A2    9/2012

OTHER PUBLICATIONS

The International Bureau of WIPO, International Preliminary Report on Patentability for PCT/US2015/012773 dated Aug. 3, 2017 (9 pages).

*Primary Examiner* — Jefferey F Harold
*Assistant Examiner* — Justin B Sanders
(74) *Attorney, Agent, or Firm* — HP Inc. Patent Department

(57) ABSTRACT

An example system, including a projector unit, an all-in-one computer attachable to the projector unit, a camera communicatively coupled to the all-in-one computer, and a touch sensitive mat communicatively coupled to the all-in-one computer. The projector unit projects an image on to the touch sensitive mat, and the touch sensitive mat comprises an optical pattern used to track a handheld device interacting with the image.

18 Claims, 6 Drawing Sheets

(51) Int. Cl.
*G06F 3/0488* (2013.01)
*G06F 3/0354* (2013.01)
*G03B 17/54* (2006.01)
*G06F 3/044* (2006.01)
*G06K 9/46* (2006.01)

(56) References Cited

U.S. PATENT DOCUMENTS

| | | | |
|---|---|---|---|
| 2010/0001963 A1* | 1/2010 | Doray | G06F 3/03545 345/173 |
| 2010/0066675 A1 | 3/2010 | Wilson et al. | |
| 2013/0226444 A1* | 8/2013 | Johansson | G06F 3/0488 701/300 |
| 2014/0139668 A1* | 5/2014 | Short | H04N 7/18 348/143 |

* cited by examiner

TRACKING A HANDHELD DEVICE ON SURFACES WITH OPTICAL PATTERNS

BACKGROUND

Computer systems typically employ a display or multiple displays which are mounted on a support stand and/or are incorporated into some other component of the computer system. For displays employing touch sensitive technology (e.g., touch screens), it is often desirable for a user to interact directly with such displays in order to fully utilize such touch technology during system operations.

Devices such as touch screens provide an elegant, simple, and industrially clean design for providing capabilities of both input, e.g. touch, and output, e.g. display. For example, a user can use capacitive or active pens to write directly on a touch surface. A touchscreen can be formed by placing a transparent overlay proximate the display surface. Such overlays typically detect the presence and location of input, e.g. a touch, based upon a change in electrical properties of the overlay.

BRIEF DESCRIPTION OF THE DRAWINGS

For a detailed description of various examples, reference will now be made to the accompanying drawings in which.

DETAILED DESCRIPTION

Figure 1:
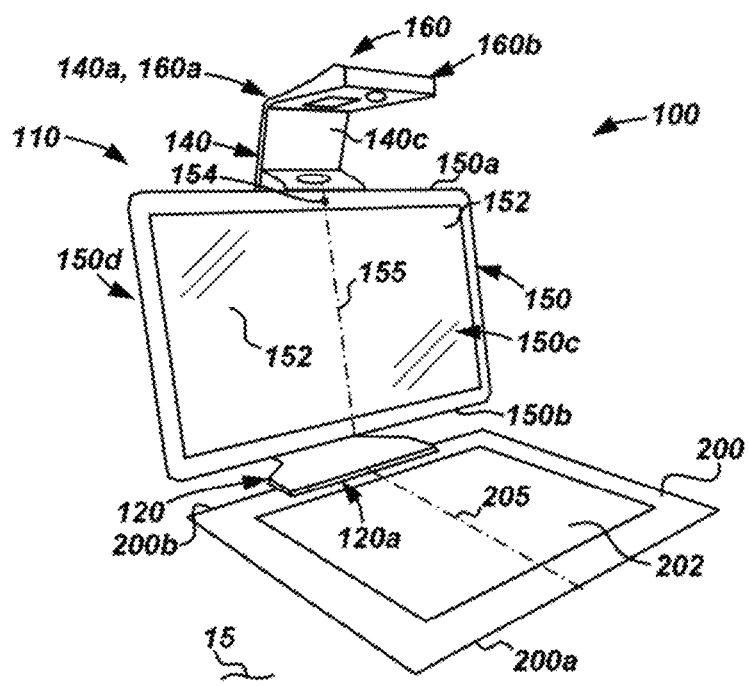
FIG. 1 is a schematic perspective view of an example of a computer system in accordance with the principles disclosed herein.
Figure 2:
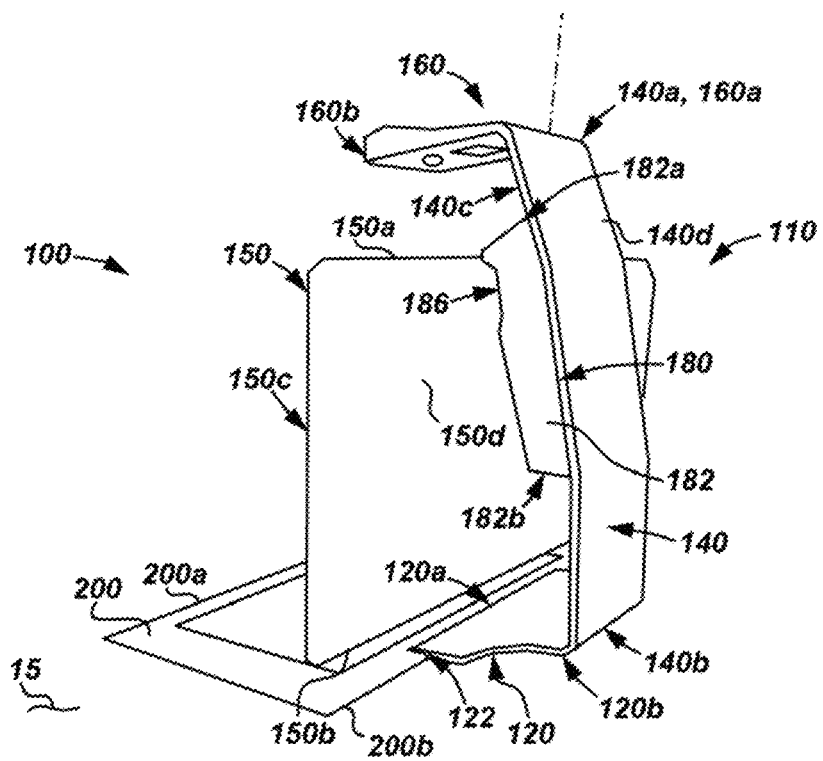
FIG. 2 is another schematic perspective view of the computer system of FIG. 1 in accordance with the principles disclosed herein.

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

The following terminology is understood to mean the following when recited by the specification or the claims. The singular forms "a," "an," and "the" mean "one or more." The terms "including" and "having" are intended to have the same inclusive meaning as the term "comprising."

Referring now to FIGS. 1-4, a computer system 100 in accordance with the principles disclosed herein is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

In one implementation, mat 200 includes a dot pattern. Such dot pattern may be capable of providing unique information, which will be described in greater detail below. In one implementation, an example pattern capable of providing unique encoded absolute positional information may be the Anoto dot pattern. In some implementations, such dot pattern may be visible to human eye (e.g., black dots on white surface or vice versa). In another implementations, the dot pattern may be invisible to the human eye (e.g., IR dots seen by infra-red camera). The dot pattern may be printed on a separate layer, and may be positioned between different layers of the mat.

Figure 3:
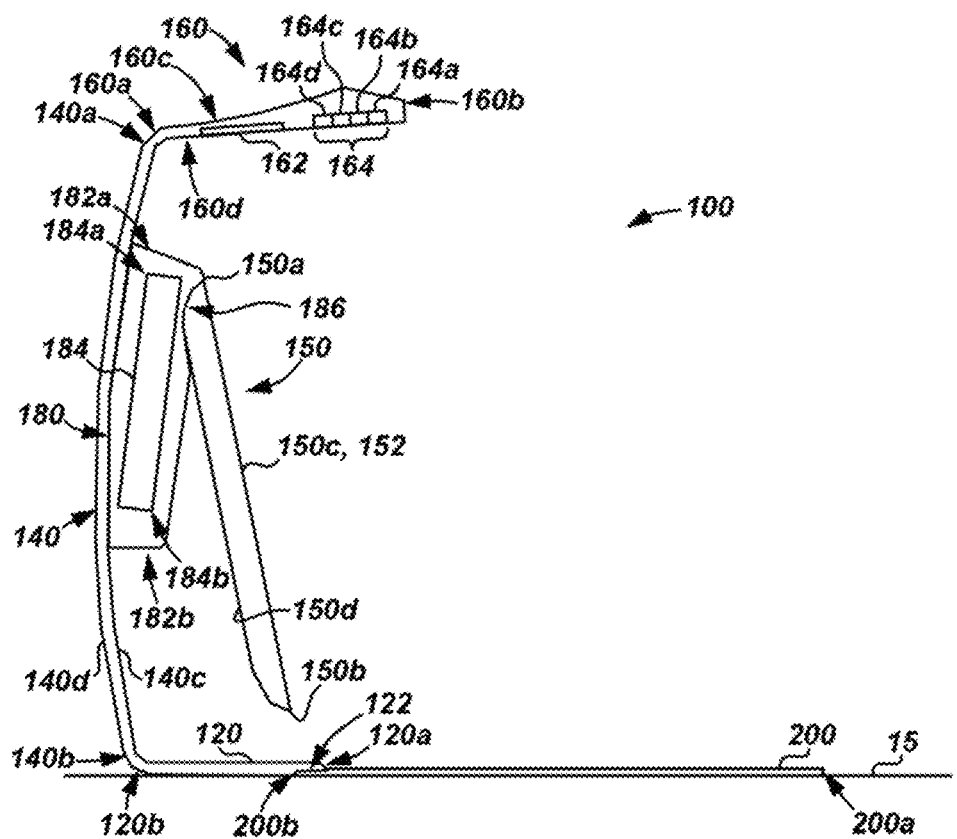
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this embodiment, housing 182 further includes a coupling or mounting member 186 to engage with and support device 150 during operations. In general member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
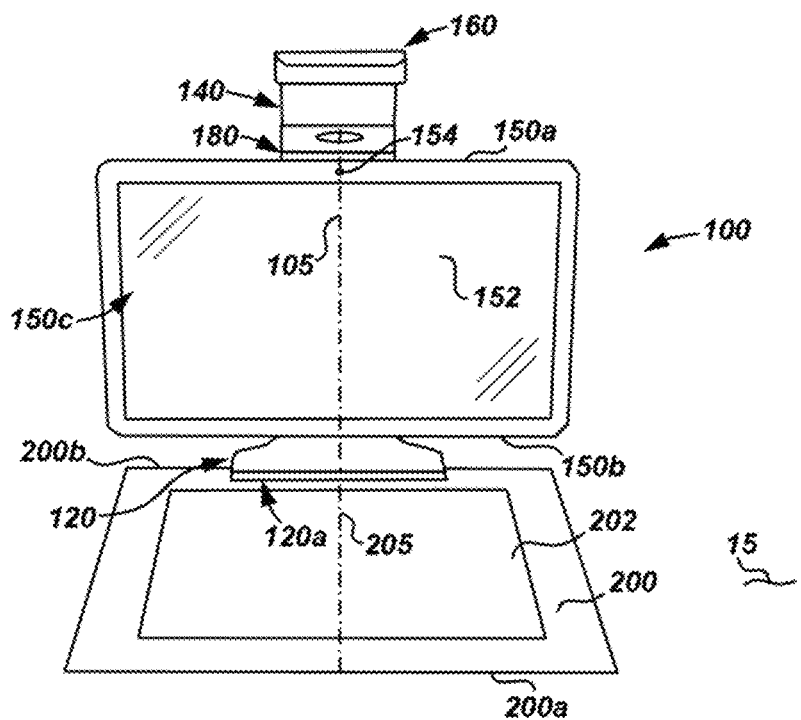
FIG. 4 is a schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a color camera) 164b, a depth sensor or camera 164c, and a three dimensional (3D) user interface sensor 164d. Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object and/or document disposed on mat 200. Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Thus, in some implementations, sensor 164c may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. User interface sensor 164d includes any suitable device or devices (e.g., sensor or camera) for tracking a user input device such as, for example, a hand, stylus, pointing device, etc.

The handheld user input device such as a digital stylus or digital pen may include a detector. A predetermined series of positionally-encoded elements usually in the form of dots, squares, or similar marks may be provided on a display device. One such series of elements is the unique, predetermined positionally-encoded pattern provided by Anoto Group AB (Lund, Sweden). Using the predetermined pattern, a detector can determine its location with respect to the pattern when placed proximate the pattern. The location resolution capability of the detector may, for example, be increased (1) by increasing the positional accuracy of the elements relative to each other, and/or (2) by increasing the number of dots used simultaneously to ascertain a location address, such that error is decreased in locating the dots. The detector may be a two-dimensional array detector such as a CMOS or charge-coupled device (CCD) imager. The detector may be suitably designed to be capable of high-resolution detection, such that it supports the location resolution capability of the pattern, as described above. A visibly transparent, predetermined, element pattern may be disposed in, on, or about a visibly transparent carrier. In one example, a source may generate polarized light. The source may be internal to a computing device housing the display or may be external to the computing device, for example part of the handheld device. The polarized light generated may be passed through a predetermined pattern of visibly transparent polarizing state altering elements disposed on the surface of a display device, and a change in the polarization state of the polarized light between the positionally-encoded elements and the display background may be detected by a detector. The change may correspond to a location of the detector on the display device. In some examples, the location may be determined with high resolution and accuracy. The handheld device may include a transmitter to transmit data representing the location of the detector to a computing device. In response, the computing device may cause the display device to modify its output.

Although the optical pattern is described above as comprised of polarizing elements, other types of optical patterns may also be used. For example, rather than polarizing elements, the pattern may be a pattern of near-infrared (near-IR) absorbing ink printed elements, such as dots or any other shape. In this example, the source, which is external or internal to the computing device, may generate near-IR light that is absorbed by the absorbing elements. The near-IR light need not be polarized. The near-IR light may be passed through the pattern of absorbing elements and reflected or passed to the detector. The detector may detect the pattern based on a detected contrast between regions in which absorbing elements absorbed the near-IR light, and regions in which there were no absorbing elements and therefore the near-IR light was not absorbed.

In other examples, any other optical pattern may be provided that enables detection using optical methods, using any suitable type of elements that make up the optical pattern, with or without a light source.

The above system may provide high resolution and high accuracy of touch-based input on displays, and visually transparent input systems. However, in some examples, there may be multiple displays and/or multiple handheld devices present in the vicinity of the handheld device.

Accordingly, the present disclosure provides systems and methods to provide, in a multi-display system, the capability of identifying to which display a handheld device used for display interaction is proximate. The present disclosure may also provide, in a multi-handheld device system, the capability of managing inputs from the various handheld devices.

As used herein, the term "light" refers to electromagnetic radiation falling within the visible spectrum, which extends from 400 nanometers (violet) to 700 nanometers (red). The term "light" may also include electromagnetic radiation falling within the near-infrared spectrum, extending from 700 nanometers to 3000 nanometers.

Referring still to FIG. 3, in some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

During operation of system 100, light is emitted from projector assembly 184, and reflected off of mirror 162 towards mat 200 thereby displaying an image on a projector display space on the mat 200. In addition, device 150 may also display an image on the display 152 (which may or may not be the same as the image projected onto surface 202 by assembly 184). The image projected by assembly 184 may comprise information and/or images produced by software executing within device 150. A user (not shown) may then interact with the image displayed on surface 202 and display 152 by physically engaging the touch sensitive surface 202 of mat 200. Such interaction may take place through any suitable method such as, direct interaction with a stylus 25, or other suitable user input device(s).

Figure 5:
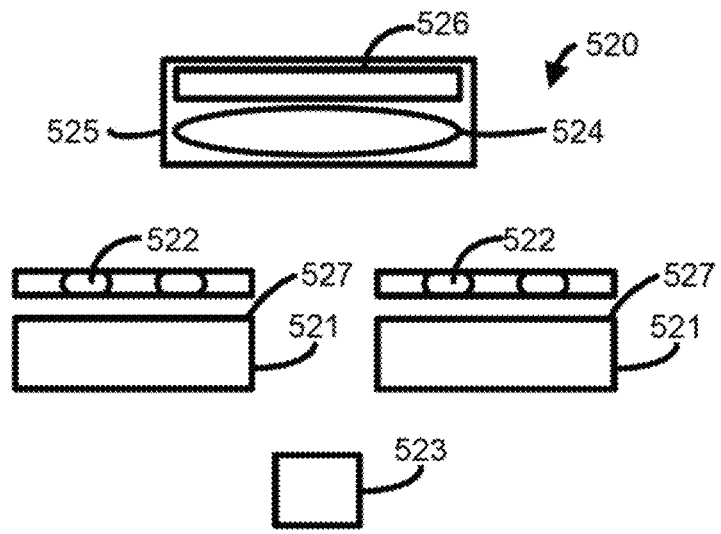
FIG. 5 is a block diagrams illustrating positional input system in accordance with the principles disclosed herein.

FIG. 5 is a block diagram illustrating a positional input system 520 of a stylus according to some examples. The system 520 may include a plurality of displays 521 (similar to display areas 150 and 200 shown in FIG. 1). Each of the displays 521 may have disposed thereon a respective predetermined optical pattern 522. The system 520 may include a processor 523 to determine to which a display of a plurality of displays 521 a detector 524 is proximate. Although the processor 523 is shown external to other elements in the system 520, the processor 523 may be located in any of the devices. The system 520 may include a handheld device 525 (e.g, stylus 25 in FIG. 7) having the detector 524 and a transmitter 526. Moreover, the handheld device 525 may have a controller. The detector 524 may be to detect a part of the predetermined pattern disposed on the display 521 to which the detector 524 is proximate. The part of the predetermined pattern may correspond to a location on a surface 527 of the display 521. The transmitter 526 may be to transmit data representing the location of the handheld device to a computing device communicatively coupled to the handheld device 525. Further, the controller may include a processor and computer-readable medium. It should be noted that rather than one handheld device, there may be two, three, four, or any greater number of handheld devices.

Figure 6:
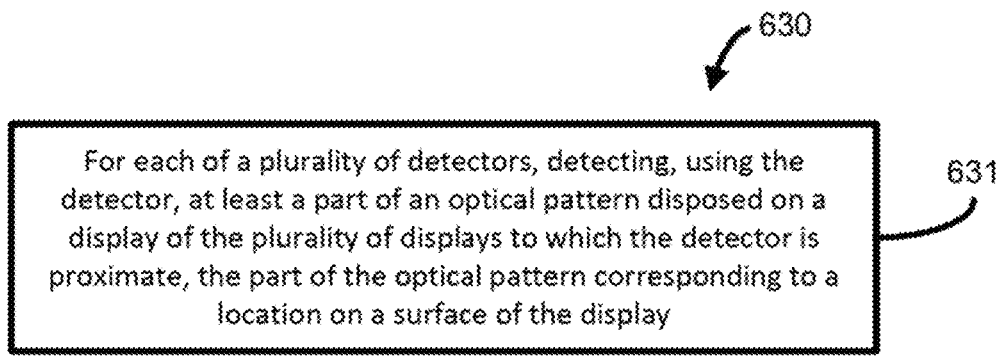
FIG. 6 is a flow diagram illustrating positional input method in accordance with the principles disclosed herein.

FIG. 6 is a flow diagram illustrating a positional input method 630 according to some examples. The method may be performed in a system comprising a plurality of displays each having disposed thereon a respective optical pattern. At 631, for each of a plurality of detectors, at least a part of an optical pattern disposed on a display of the plurality of displays to which the detector is proximate may be detected using the detector. The part of the optical pattern may correspond to a location on a surface of the display. An example pattern capable of providing unique encoded absolute positional information is the Anoto dot pattern. In one implementation, such dot pattern may be visible to human eye (e.g., black dots on white surface or vice versa). In another implementation, the dot pattern may be invisible to the human eye (e.g., IR dots seen by infra-red camera). Disposing polarizing elements in an Anoto compliant pattern provides a unique location identification system using the detector capable of detecting the changed polarization state of the light passing through the polarizing elements. Although the Anoto dot pattern is used as an illustrative example, any comparable predetermined pattern capable of providing unique encoded absolute positional information between the visibly transparent elements may be similarly employed to dispose or locate the elements in, on, or about the carrier.

Since changes in the polarization state of light are imperceptible to the human eye, the light emitted by the display may appear uniform across the display regardless of the changed polarization states of the light. The ability to provide a visually transparent carrier containing visually transparent polarizing elements may enable the use of a detector sensitive to the changed polarization state of the light passing through the polarizing elements to determine the physical location or position of the detector on the display while at the same time providing minimal impairment of the user's view of the display. The ability to provide location based data to the detector while simultaneously providing a minimally impaired view of the display to the user provides the display with the ability to contemporaneously function as both an input device, e.g. a device capable of detecting location based input via the detector, and an output device, e.g. a display capable of displaying data.

In another example, detection may be performed using near-infrared (near-IR) absorbing ink printed elements instead of polarizing elements. Any other suitable optical detection methods may also be used.

Further, the handheld device 525 (as shown in FIG. 5) may include the transmitter to transmit data representing the location of the detector to a computing device. The data representing the location may be the detected pattern. The handheld device may be communicatively coupled with the computing device over a connection. The connection may be wired or wireless. Wireless communication may be performed by a Bluetooth connection and/or any other radio frequency (RF) transmission, for example.

Figure 7:
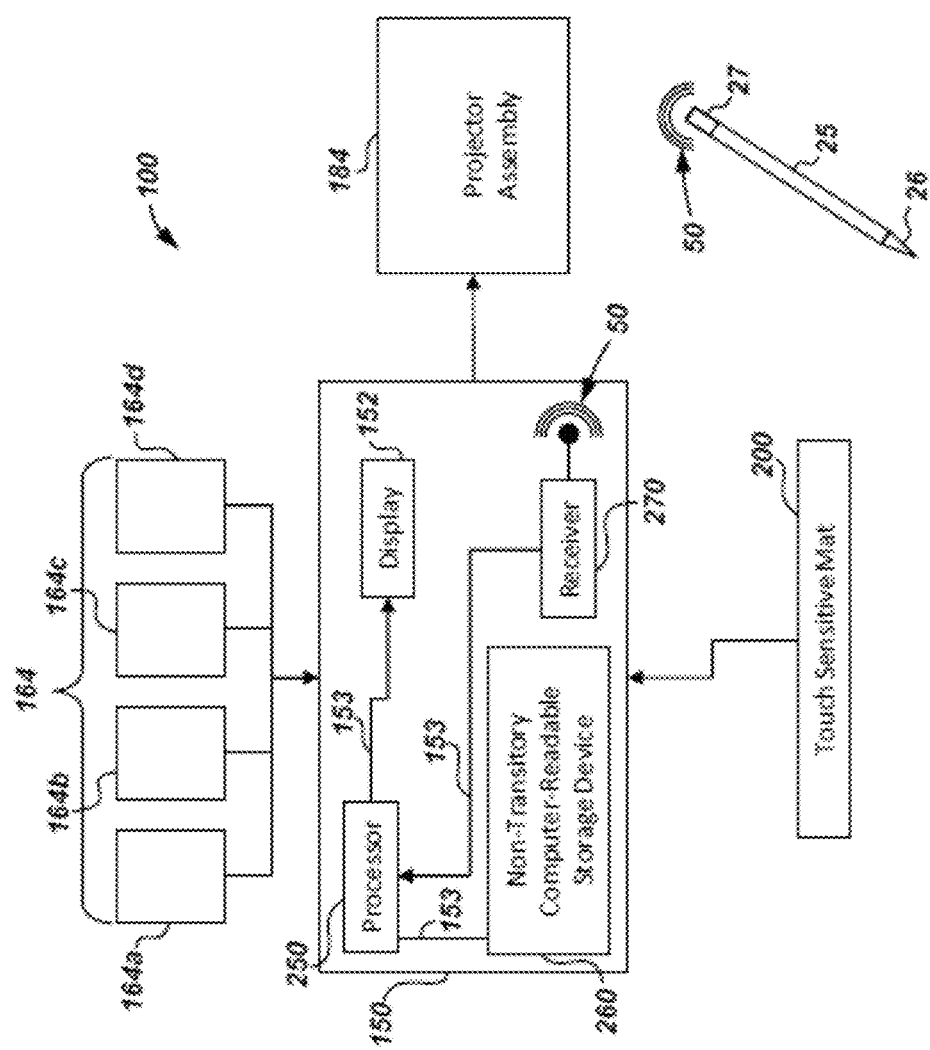
FIG. 7 is a black box circuit diagram of the computer system of FIG. 1 in accordance with the principles disclosed herein.

The user may interact with a displayed object (e.g., 2D or 3D object such as a document or a box) through the handheld device (e.g., the stylus 25) in a plurality of ways. For example, the user may choose to utilize a direct interaction method (e.g., direct writing), which is shown in FIG. 7. When a user interacts with surface 202 of mat 200, a signal is generated which is routed to device 150 through any of the electrical coupling methods and devices previously described. Once device 150 receives the signal generated within mat 200, it is routed, through internal conductor paths 153, to a processor 250 which communicates with a non-transitory computer-readable storage medium 260 to generate an output signal which is then routed back to projector assembly 184 and/or display 152 to implement a change in the image projected onto surface 202 and/or the image displayed on display 152, respectively. It should also be appreciated that during this process, a user may also be interacting with the image displayed on display 152 through engagement with the touch sensitive surface disposed thereon and/or through another user input device such as, for example, a keyboard and mouse. The stylus 25 further includes a transmitter 27 that is arranged to track the position of stylus 25 (whether or not stylus 25 is interacting with surface 202) and to communicate with a receiver 270 disposed within device 150 through a wireless signal 50. In these examples, input received by receiver 270 from transmitter 27 on stylus 25 is also routed through paths 153 to processor 250 such that an output signal may be generated and routed to the assembly 184 and/or the display 152 as previously described.

In another example, the user may interact with a displayed object on an indirect surface (e.g., clipboard, whiteboard, lapboard, paper). An indirect surface may include any type of surface, which is not directly visible to the camera of the system or directly connected to the system. Accordingly, the stylus 25 on an indirect surface needs to establish a connection with the system in order to communicate data. In one implementation, such connection may be BLUETOOTH®. The present invention provides implementations in which a user may choose to switch from a direct surface to an indirect service or vice versa. For example, a user may be using a stylus to interact with an image on the touch mat of the computing system. The user may choose to switch an indirect surface such as a whiteboard, and continue interacting with the same image. Accordingly, the invention allows such switch between plurality of surfaces (e.g., direct to indirect, indirect to indirect, or indirect to direct) while allowing the user to continue interacting with the image.

Further, in some examples, sensors disposed within bundle 164 (e.g., sensors 164*a*, 164*b*, 164*c*, 164*d*) may also generate system input which is routed to device 150 for further processing by processor 250 and device 260. For example, in some implementations, sensors within bundle 164 may sense the location and/or presence of a stylus 25 and then generate an input signal which is routed to processor 250. Processor 250 then generates a corresponding output signal which is routed to display 152 and/or projector assembly 184 in the manner described above. In particular, in some implementations, bundle 164 includes a pair of cameras or sensors that are arranged to perform stereoscopic stylus tracking (e.g., of stylus 25). In still other implementations, stylus 25 includes a tip 26 that is coated in an infrared retro-reflective coating (e.g., paint), thus allowing it to serve as an infrared retro-reflector. Bundle 164 (and more particularly sensors 164*c* or 164*d*) may then further include infrared cameras or sensors as previously described which detect infrared light that is reflected off of tip 26 of stylus 25 and thus track the location of tip 26 as is moves across surface 202 during operation.

As a result, in some examples, the image projected onto surface 202 by assembly 184 serves as a second or alternative touch sensitive display within system 100. In addition, interaction with the image displayed on surface 202 is further enhanced through use of the sensors (e.g., sensors 164*a*, 164*b*, 164*c*, 164*d*).

Figure 8:
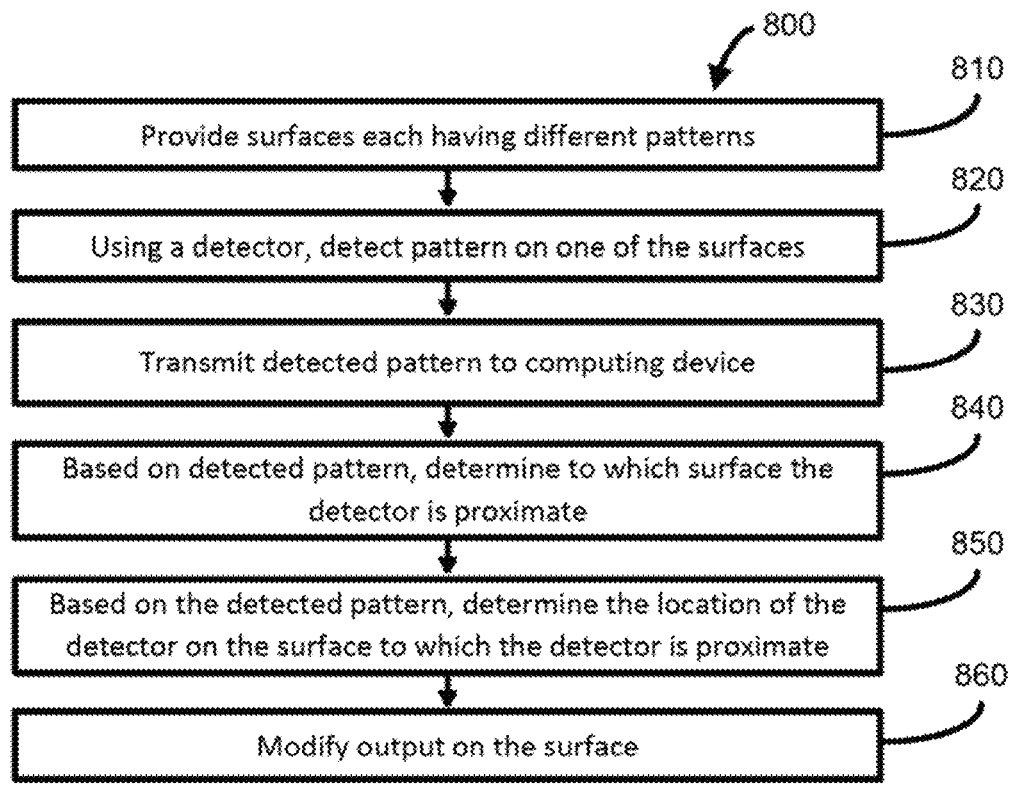
FIG. 8 is a flow diagram illustrating positional input method in accordance with the principles disclosed herein.

FIG. 8 is a flow diagram illustrating positional input method 800 according to some examples. In some examples, this method may be varied, such that some steps may be added, and some steps may be omitted. Simultaneous use of multiple handheld devices will be described relative to method 900 of FIG. 9.

Turning to FIG. 8, at 810, multiple surfaces (e.g., touch mat and other surfaces the handheld device may interact with) may be provided. Each of the surfaces may have different patterns disposed on or proximate to the surfaces relative to each other. In some examples, each pattern may be a different optical pattern of visibly transparent polarization altering elements, for example different Anoto dot patterns. In some examples, the patterns may be different from one another across the entire area on the surfaces. In other examples, the patterns may be different from one another only across part of their respective areas. For example, one of the corners, such as the top-right corner, may have a unique pattern, whereas the remainder may have an identical pattern as the rest of the surface area. In one implementation, these unique patterns may represent various icons. These icons may be tools such as cut, copy, paste, and/or alike. In some implementations, the surface may include permanent tools (e.g., cut, copy, paste), and in other implementations, the surface may be customized to include user selected tools (e.g., open, close, home).

At 820, the handheld device may be placed proximate to one of the surfaces of the computing device. For example, the handheld device may be placed proximate to a part of the surface on which a unique pattern is disposed, according to any of the examples discussed at 810. In some examples, the handheld device may be placed proximate to a pattern that is disposed on the surface, such that detection of part of the pattern disposed on the surface may serve the dual purpose of (1) determining to which surface the handheld device is proximate, and (2) determining the physical location of the handheld device on the surface to which the handheld device is proximate. This mainly applies to implementations where the handheld device is used to interact with the computing system indirectly. More specifically, if the surface that the handheld device is on is not captured or seen by the computing device, the detection of part of the pattern disposed on the surface may serve the dual purpose as described above. The handheld device may first be placed proximate specifically to a unique first pattern that identifies the surface for determining to which surface the handheld device is proximate. For example, the unique pattern may be disposed on or proximate to the surface according to any of the examples discussed at 810. Thereafter, the handheld device may be placed proximate to a part of the surface, such that detection of part of a second pattern disposed on the surface may be used for determining the physical location of the handheld device on the surface.

At 830, data representing the detected pattern may be transmitted to the computing device. At 840, based on the detected pattern, a computing device may determine which display the detector is proximate. At 850, based on the detected pattern, a computing device may determine the physical location of the handheld device and detector on the surface to which the detector was determined to be proximate at 840.

At 860, the computing device may, after determining and/or receiving the physical location data, communicate to its display to modify its output, e.g. to modify the color of pixels being displayed at the physical location. For example, if a user is using the handheld device to draw on the surface, the determined physical location of the display may display colored lines to represent the drawing in response to the handheld device being proximate to that physical location.

Figure 9:
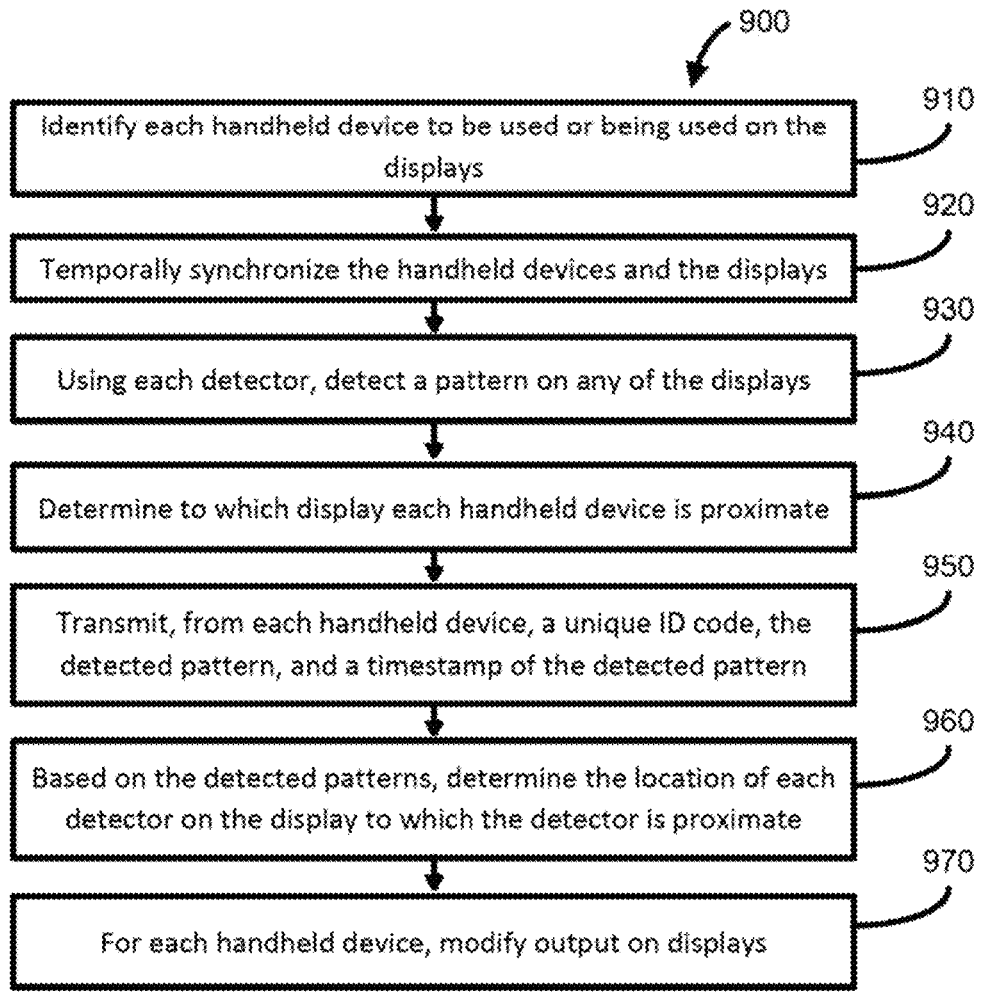
FIG. 9 is a flow diagram illustrating positional input method accordance with the principles disclosed herein.

FIG. 9 is a flow diagram illustrating a positional input method 900 according to some examples. In some examples, the methods may be varied, such that some steps may be added, and some steps may be omitted.

In the following examples examples, the same software, such as graphics software, may be open on multiple computing devices. Thus, multiple users may simultaneously work on the same drawing or project. In some examples, one user may draw on one display, and another user may draw on a different display, however the input from all users may appear on all of the displays simultaneously to allow collaborative drawing. In other examples, multiple users may work on the same display. In yet other examples, each user may only have permission to draw on one of the displays, however the output from all users using separate displays may appear on each of the displays.

At 910, each handheld device and thus its respective detector may be identified. Each handheld device may be assigned ID codes that are unique relative to each other. At 920, once communication is established between the devices according to the connections, each of the computing devices and the handheld devices may synchronize their timers, e.g. clocks such that time stamps for actions by any of the devices can be compared to determine whether the actions occurred simultaneously or at different points in time.

At 930, each detector of the handheld devices may respectively detect a part of a pattern on one of the surfaces (or displays). At 940, it may be determined to which computing device and display each handheld device is associated. This may be done, for example, by determining to which computing device's display each handheld device is proximate. In some examples, multiple handheld devices may be proximate to the same computing device's display. In other examples, each handheld device may be proximate to different displays.

At 950, each handheld device may transmit, to one or more computing devices, data representing the pattern it detected, the handheld device's ID code, and the timestamp of the detection of the pattern. In examples in which each handheld devices itself determined to which computing devices it is proximate, the respective handheld devices may communicate the detected pattern only to the computing device to which it is proximate. In examples in which one of the computing devices determined that a given handheld device is proximate to it, the handheld device may communicate the detected pattern to each of the computing devices.

At 960, based on the detected pattern, each computing may determine the physical location of the handheld device and detector on the display to which the detector was determined to be proximate. At 970, the computing device to which a handheld device is proximate may communicate to its display to modify its output, e.g. to modify the color of pixels being displayed at the physical location. For example, if a user is using a handheld device to draw on the display, the determined physical location of the display may display colored lines to represent the drawing in response to the handheld device being proximate to that physical location. The output may be modified in accordance with the ID code of the handheld device, such that the modified output is different depending on which handheld device is being used on the respective computing device. For example, one handheld device may draw in a first color, and another handheld device may draw in a second, different color. In other examples, other visual cues other than colors may be used to visually identify which handheld device interacted with a display.

Because each handheld device is separately identified with an ID code, certain permissions may be available to some users but not to other users. For example, each user may have sole permission to erase their own drawing marks.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A system, comprising:
   a handheld device;
   a projector;
   an all-in-one computer attachable to the projector;
   a camera communicatively coupled to the all-in-one computer;
   a touch sensitive mat communicatively coupled to the all-in-one computer, wherein the touch sensitive mat has a touch sensitive surface to receive a touch input by the handheld device,
   wherein the projector is to project an image onto the touch sensitive mat, and
   wherein the touch sensitive mat comprises an optical pattern used to track the handheld device interacting with the image projected on the touch sensitive mat, and
   wherein the handheld device comprises a detector to detect the optical pattern based on:
     passing a polarized light generated by a source through the optical pattern, the optical pattern being a predetermined pattern of visibly transparent polarizing elements disposed on the touch sensitive mat; and
     detecting a change in a polarization state of the polarized light between the visibly transparent polarizing elements and a surface of the touch sensitive mat, the change in the polarization state corresponding to a location on the touch sensitive mat.

2. The system of claim 1, wherein the handheld device is to interact with the image on another surface that has an optical pattern and that is separate from the touch sensitive mat, and to communicate data associated with the interaction with the image on the another surface to the all-in-one computer.

3. The system of claim 1, further comprising a support structure including a base, an upright member extending upward from the base, and a cantilevered top extending outward from the upright member.

4. The system of claim 2, wherein the cantilevered top includes a fold mirror, and the projector is to project the image upward to reflect off the mirror onto the touch sensitive mat.

5. The system of claim 1, wherein the optical pattern comprises a pattern of dots.

6. The system of claim 1, wherein the optical pattern is invisible to a user.

7. A method comprising:
   in a system comprising a plurality of touch sensitive surfaces each having disposed thereon a respective optical pattern:
     for each respective handheld device of a plurality of handheld devices used to interact with an object on the plurality of touch sensitive surfaces, detecting a part of an optical pattern disposed on a respective touch sensitive surface of the plurality of touch sensitive surfaces to which the respective handheld device is proximate, the part of the optical pattern corresponding to a location on the respective touch sensitive surface, wherein the optical pattern disponed on the respective touch sensitive surface comprises visibly transparent polarizing elements; and
     modifying the object on one or more of the touch sensitive surfaces in response to one of the handheld devices detecting a first optical pattern of the optical patterns, the modifying of the object being different depending on which of the handheld devices detects the first optical pattern, the detecting of the first optical pattern comprising detecting a change in a polarization state of a polarized light passed through a portion of the visibly transparent polarizing elements of the first optical pattern.

8. The method of claim 7, wherein the object includes an image, and wherein one of the plurality of touch sensitive surfaces is part of a touch sensitive mat onto which the image is projected, and another of the plurality of touch sensitive surfaces is part of a display to display the image.

9. The method of claim 7, wherein the plurality of handheld devices communicate with the system using wireless communication.

10. An apparatus, comprising:
a handheld device;
a plurality of touch sensitive surfaces, each of the touch sensitive surfaces having disposed thereon a respective optical pattern; and
a processor to determine a first touch sensitive surface of the plurality of touch sensitive surfaces the handheld device is proximate; and
the handheld device comprising:
 a detector to detect a part of the optical pattern disposed on the first touch sensitive surface to which the handheld device is proximate, the part of the optical pattern corresponding to a location on the first touch sensitive surface, and the detector is to detect the part of the optical pattern of the first touch sensitive surface based on:
  passing a polarized light generated by a source through the optical pattern of the first touch sensitive surface, the optical pattern of the first touch sensitive surface comprising a predetermined pattern of visibly transparent polarizing elements disposed on the first touch sensitive surface; and
  detecting a change in a polarization state of the polarized light passing through the part the first touch sensitive surface;

a transmitter to transmit data representing the location of the handheld device to a computing device communicatively coupled to the handheld device.

11. The system of claim 1, wherein the all-in-one computer comprises a display to also display the image.

12. The system of claim 11, wherein the all-in-one computer is to modify the image displayed in the display in response to data from the handheld device, the data representing a part of the optical pattern detected by the detector of the handheld device.

13. The system of claim 1, further comprising a three dimensional (3D) sensor to track a location of the handheld device as the handheld device is moved about the touch sensitive mat.

14. The system of claim 2, wherein the another surface is part of a display.

15. The system of claim 1, wherein different parts of the touch sensitive mat have respective different unique patterns, the different unique patterns being part of the optical pattern.

16. The system of claim 15, wherein a first pattern of the different unique patterns represents an icon that when selected by the handheld device based on touch interaction by the handheld device with the first pattern on the touch sensitive mat is to cause the all-in-one computer to perform a respective task corresponding to the icon.

17. The method of claim 7, further comprising:
stereoscopically tracking, by a three dimensional (3D) user interface sensor, a location of a first handheld device of the plurality of handheld devices as the first handheld device is moved by a user about a first touch sensitive surface of the plurality of handheld devices.

18. The apparatus of claim 10, wherein the first touch sensitive surface is part of a touch sensitive mat, and a second touch sensitive surface of the plurality of touch sensitive surfaces is part of a touch sensitive display.

* * * * *